(12) United States Patent
Kozhaya et al.

(10) Patent No.: US 11,663,518 B2
(45) Date of Patent: *May 30, 2023

(54) COGNITIVE SYSTEM VIRTUAL CORPUS TRAINING AND UTILIZATION

(71) Applicant: International Business Machines Corporation, Armonk, NY (US)

(72) Inventors: Joseph N. Kozhaya, Morrisville, NC (US); Christopher M. Madison, Charlotte, NC (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 991 days.

This patent is subject to a terminal disclaimer.

(21) Appl. No.: 16/391,398

(22) Filed: Apr. 23, 2019

(65) Prior Publication Data
US 2019/0251473 A1    Aug. 15, 2019

Related U.S. Application Data

(63) Continuation of application No. 14/854,108, filed on Sep. 15, 2015, now Pat. No. 10,318,885.

(51) Int. Cl.
*G06N 20/00*    (2019.01)
*G06F 16/93*    (2019.01)
(Continued)

(52) U.S. Cl.
CPC ......... *G06N 20/00* (2019.01); *G06F 16/3331* (2019.01); *G06F 16/93* (2019.01); *G06N 5/02* (2013.01)

(58) Field of Classification Search
CPC .......... G06N 20/00; G06N 5/02; G06F 16/93; G06F 16/3331
See application file for complete search history.

(56) References Cited

U.S. PATENT DOCUMENTS 7,548,908 B2    6/2009    Fu et al.
7,634,632 B2    12/2009   Suponau et al.
(Continued)

OTHER PUBLICATIONS

Wang, Variance Reduction for Stochastic Gradient Optimization, NIPS'13 Proceedings of the 26th International Conference on Neural Information Processing Systems, vol. 1, 2013, pp. 181-189 (Year: 2013).*

(Continued)

*Primary Examiner* — George Giroux
(74) *Attorney, Agent, or Firm* — Stephen J Walder, Jr.; Jared Chaney

(57) ABSTRACT

Mechanisms are provided for implementing a virtual corpus engine that receives an inquiry to be processed and analyzes the inquiry to extract one or more features of the inquiry. The virtual corpus engine selects a weight matrix associated with a virtual corpus based on the extracted one or more features of the inquiry. The virtual corpus comprises a plurality of actual corpora of information. The weight matrix comprises a separate weight value for each actual corpus in the plurality of actual corpora. The virtual corpus engine processes the inquiry using a set of selected actual corpora selected from the plurality of actual corpora based on the weight values in the weight matrix and receives results of the processing of the inquiry using the set of selected actual corpora. The virtual corpus engine outputs the results of the processing of the inquiry.

20 Claims, 5 Drawing Sheets

(51) Int. Cl.
*G06N 5/02* (2023.01)
*G06F 16/33* (2019.01)

(56) References Cited

U.S. PATENT DOCUMENTS

| | | | | |
|---|---|---|---|---|
| 8,145,636 | B1* | 3/2012 | Jeh | G06F 16/353 |
| | | | | 707/750 |
| 8,484,205 | B1 | 7/2013 | Cohen | |
| 8,688,714 | B1 | 4/2014 | Upstill et al. | |
| 8,818,880 | B1 | 8/2014 | Sachan et al. | |
| 10,318,885 | B2* | 6/2019 | Kozhaya | G06F 16/93 |
| 2006/0200462 | A1 | 9/2006 | Kadayam et al. | |
| 2009/0287678 | A1 | 11/2009 | Brown et al. | |
| 2010/0185659 | A1* | 7/2010 | Bai | G06F 16/313 |
| | | | | 707/769 |
| 2010/0198857 | A1* | 8/2010 | Metzler | G06Q 30/02 |
| | | | | 705/14.54 |
| 2011/0066587 | A1 | 3/2011 | Ferrucci et al. | |
| 2011/0125734 | A1 | 5/2011 | Duboue et al. | |
| 2013/0007055 | A1 | 1/2013 | Brown et al. | |
| 2013/0018652 | A1 | 1/2013 | Ferrucci et al. | |
| 2013/0066886 | A1 | 3/2013 | Bagchi et al. | |
| 2015/0026163 | A1 | 1/2015 | Haggar et al. | |
| 2017/0076223 | A1 | 3/2017 | Kozhaya et al. | |

OTHER PUBLICATIONS

Gabrielatos (Selecting query terms to build a specialized corpus from a restricted-access database, Jun. 2007, pp. 5-44) (Year: 2007).*

Madhavan et al. (Corpus-based Scheme Matching, 2005, pp. 1-12) (Year: 2005).*

List of IBM Patents or Patent Applications Treated as Related, Apr. 23, 2019, 2 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. Vol. 56 No. 3/4 Paper 3, May/Jul. 2012, p. 3:1-3:15.

Wang, Chong et al., "Variance Reduction for Stochastic Gradient Optimization", NIPS '13 Proceedings of the 26th International Conference on Neural Information Processing systems, vol. 1, 2013, Dec. 5-10, Lake Tahoe, Nevada, 9 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

COGNITIVE SYSTEM VIRTUAL CORPUS TRAINING AND UTILIZATION

BACKGROUND

The present application relates generally to an improved data processing apparatus and method and more specifically to mechanisms for training and utilizing a virtual corpus to perform cognitive operations in a cognitive system, such as a Question and Answer system, advanced search engine, recommendation engine, or other cognitive system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating cognitive systems which perform advanced processing of requests for information. One example of a cognitive system is a Question and Answer (QA) system which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Sin® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory having instructions which, when executed by the processor, causes the processor to implement a virtual corpus engine. The method comprises receiving, by the virtual corpus engine of the data processing system, an inquiry to be processed and analyzing, by the virtual corpus engine, the inquiry to extract one or more features of the inquiry. The method further comprises selecting, by the virtual corpus engine, a weight matrix associated with a virtual corpus based on the extracted one or more features of the inquiry. The virtual corpus comprises a plurality of actual corpora of information. The weight matrix comprises a separate weight value for each actual corpus in the plurality of actual corpora. The method also comprises processing, by the virtual corpus engine, the inquiry using a set of selected actual corpora selected from the plurality of actual corpora based on the weight values in the weight matrix and receiving, by the virtual corpus engine, results of the processing of the inquiry using the set of selected actual corpora. In addition, the method comprises outputting, by the virtual corpus engine, the results of the processing of the inquiry.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
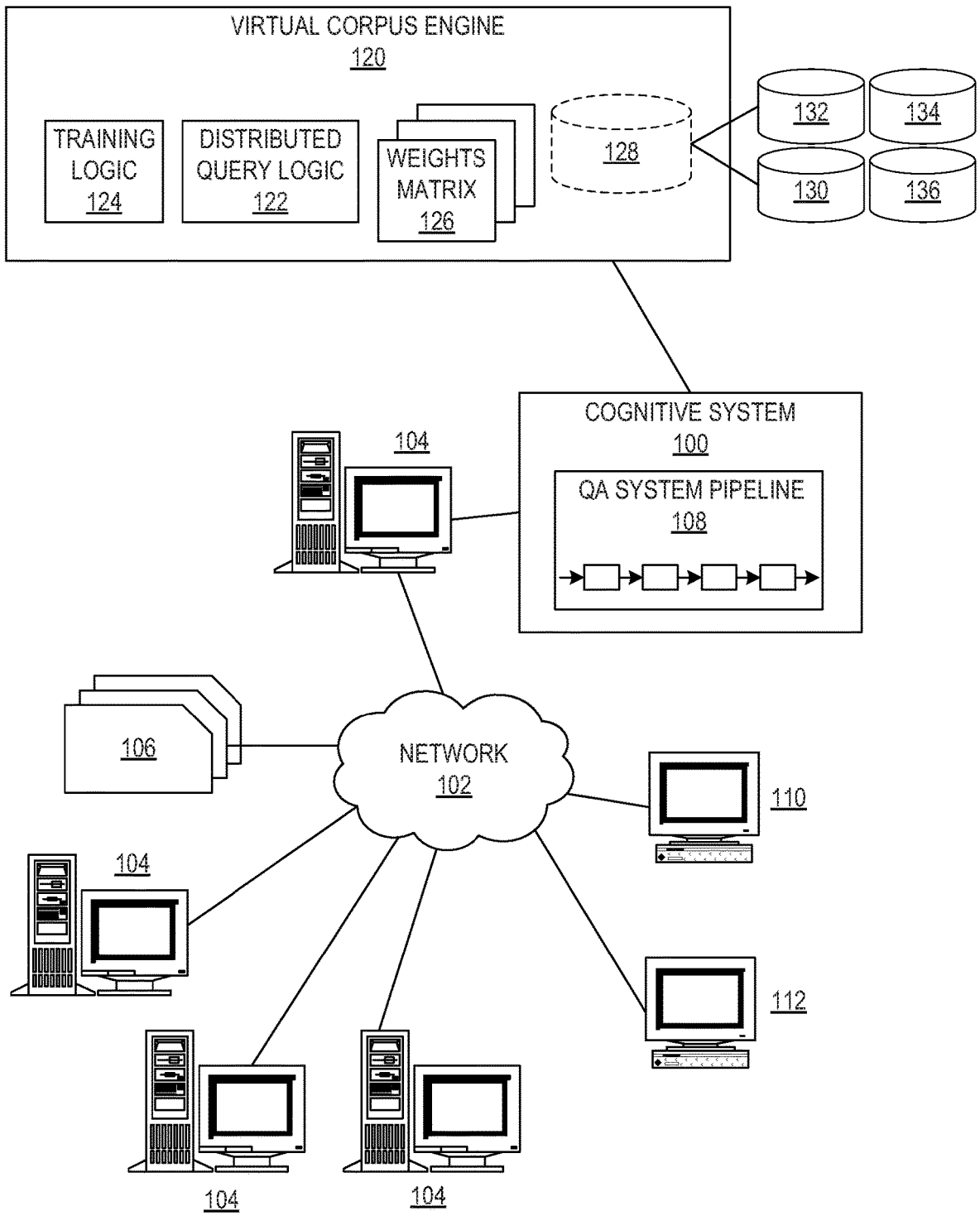
FIG. 1 depicts a schematic diagram of one illustrative embodiment of a question/answer creation (QA) system in a computer network.

The illustrative embodiments provide mechanisms for training and utilizing a virtual corpus to perform cognitive operations in a cognitive system, such as a Question and Answer system, advanced search engine, recommendation engine, or other cognitive system. In distributed cognitive systems, having multiple instances of the cognitive system being deployed, a distributed set of corpora of information upon which the cognitive systems operate, may be maintained by a plurality of different content providers. An individual corpus may be well suited for use with the operations of one instance of a cognitive system but may be less effective when used to perform other cognitive operations of other cognitive systems. That is, sources of information may be more trusted for performing cognitive operations with regard to one topic, concept, or domain, and less trusted for other topics, concepts, or domains. Thus, less accurate results may be obtained if the source is included in a corpus of information for a topic, concept, or domain that it is not well suited for than would otherwise be obtained should the source be eliminated from the corpus.

The illustrative embodiments, recognizing this issue with regard to distributed cognitive systems and corpora, provide mechanisms by which a virtual corpus, comprising a plurality of actual corpora provided by various sources, is customized over time based on evaluation of the effectiveness of the various actual corpora in performing cognitive operations. The distributed corpora may be "closed" corpora, meaning that the distributed corpora may be accessed for processing a query, but the training status of the corpora may be unknown, i.e. there is no assumption that the corpora are in a fully trained state.

The general idea is to create trusted sources of information, i.e. a virtual corpus, by topic, concept, or domain, from a variety of corpora. The corpora represent bodies of knowledge with varying degrees of overlap. Over time, the virtual corpus is trained to trust one or more actual corpora for a given topic, concept, or domain. The end goal is to refer to only the trusted sources for inquiries for a given topic, concept, or domain by removing untrusted sources of information from the virtual corpus.

With the mechanisms of the illustrative embodiments, a virtual corpus is created that includes a plurality of actual corpora provided by a plurality of different sources of corpora. An inquiry is submitted to the cognitive system which utilizes the virtual corpus to perform a cognitive operation to respond to the inquiry. The inquiry is classified by topic, concept, domain, or the like, hereafter referred to collectively as "topic" T. The topic T may be extracted from the inquiry through analysis of the inquiry to extract primary features of the inquiry. If the topic T is new and has not been encountered previously by the cognitive system, a matrix is initialized for the topic T giving equal weight to each associated actual corpus C within the virtual corpus VC. The weights indicate the level of reliability of the information provided by the corresponding corpus when providing results to an inquiry associated with topic T.

The cognitive system may generate one or more queries that are submitted to the virtual corpus which in turn submits each of the queries to each of the actual corpora C and aggregates responses obtained from the various corpora C. Thus, the queries are applied to each of the corpora C which individually generate a set of results. Each set of results is returned to the virtual corpus mechanisms which in turn returns the results to the cognitive system. The source of the sets of results is maintained so that it can be determined which corpus C each result came from. The results may be compared against a ground truth, may be presented to users to solicit feedback, or otherwise evaluated to determine the accuracy of the results obtained from each of the corpora C.

In one illustrative embodiment, the results from each of the corpora C are presented to a user that submitted the original inquiry for evaluation and user feedback. For example, the results may be presented to the user and the user may evaluate each result with a range of possible user feedback values, e.g., 0 to 5 "stars" or any other suitable user feedback value range. Based on the user feedback, the weights associated with the various corpora C are adjusted for the particular topic T. Thus, each topic T has its own matrix of weights that are trained over time to indicate which corpora C of the virtual corpus VC are the most effective in providing accurate results for queries involving the topic T.

As the training of the virtual corpus for various topics T progresses, the weights in the matrices of the various topics T are adjusted based on the evaluation of the results, e.g., user feedback. Ideally, for a particular topic T, one or more corpora will become "trusted" sources of information while other corpora may become "untrusted" sources of information. A trusted source is a source whose associated corpora weight has met or exceeded a threshold value. An untrusted source is a source whose associated corpora weight has fallen below the threshold value, or another threshold value, e.g., a first threshold may be used to indicate trusted sources, and a second threshold may be used to indicate untrusted sources.

With the training of the virtual corpus, subsequent inquiries are submitted to the cognitive system which then processes the inquiry using the trained virtual corpus. The virtual corpus has preferably eliminated the untrusted sources, and therefore their corpora, from the virtual corpus. Thus, the untrusted sources will not be used as a basis for generating results for the subsequent inquiries. Moreover, the results generated from the trusted sources and the sources that are indeterminate sources, i.e. sources that are neither determined to be trusted or untrusted, may be weighted accordingly, based on their weights in the matrix for the topic T of the inquiry. Thus, more trusted sources will have higher weights than less trusted sources and sources that are untrusted are eliminated from the virtual corpus entirely, or given zero weight value. As a result, a more accurate operation of the distributed cognitive system is made possible by the implementation of the illustrative embodiments.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
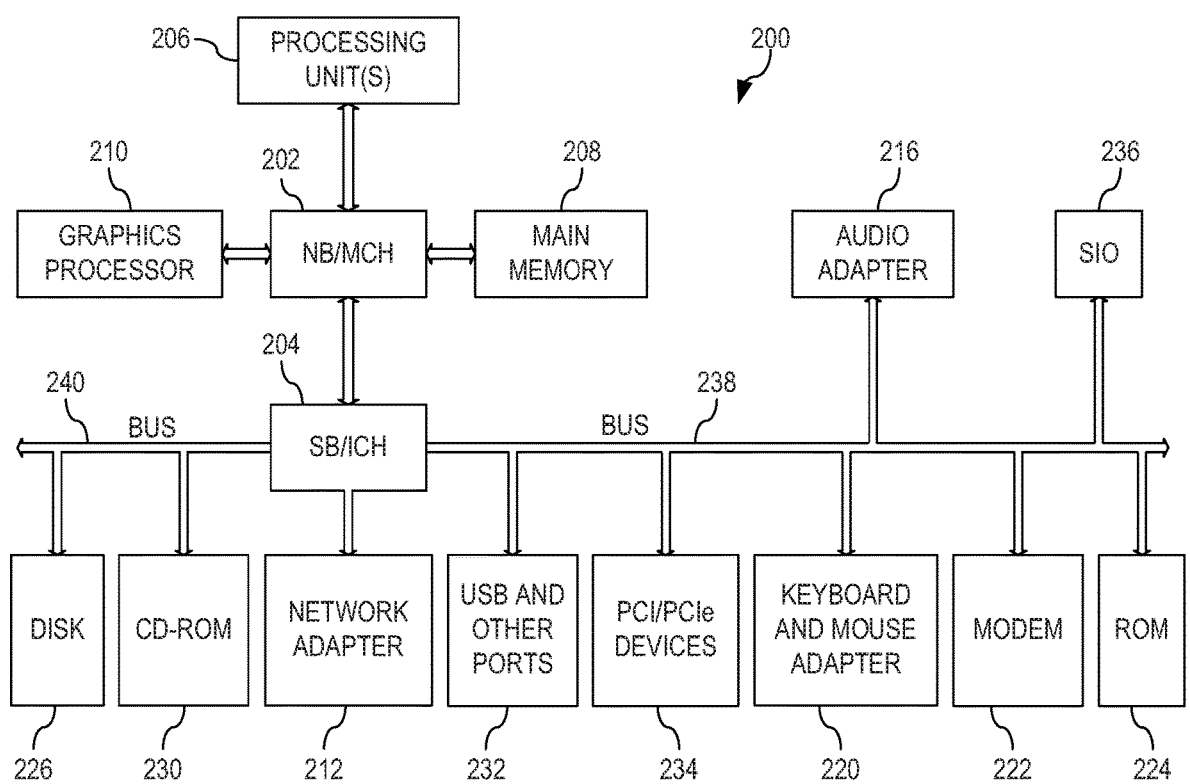
FIG. 2 is a block diagram of an example data processing system in which aspects of the illustrative embodiments are implemented.
Figure 3:
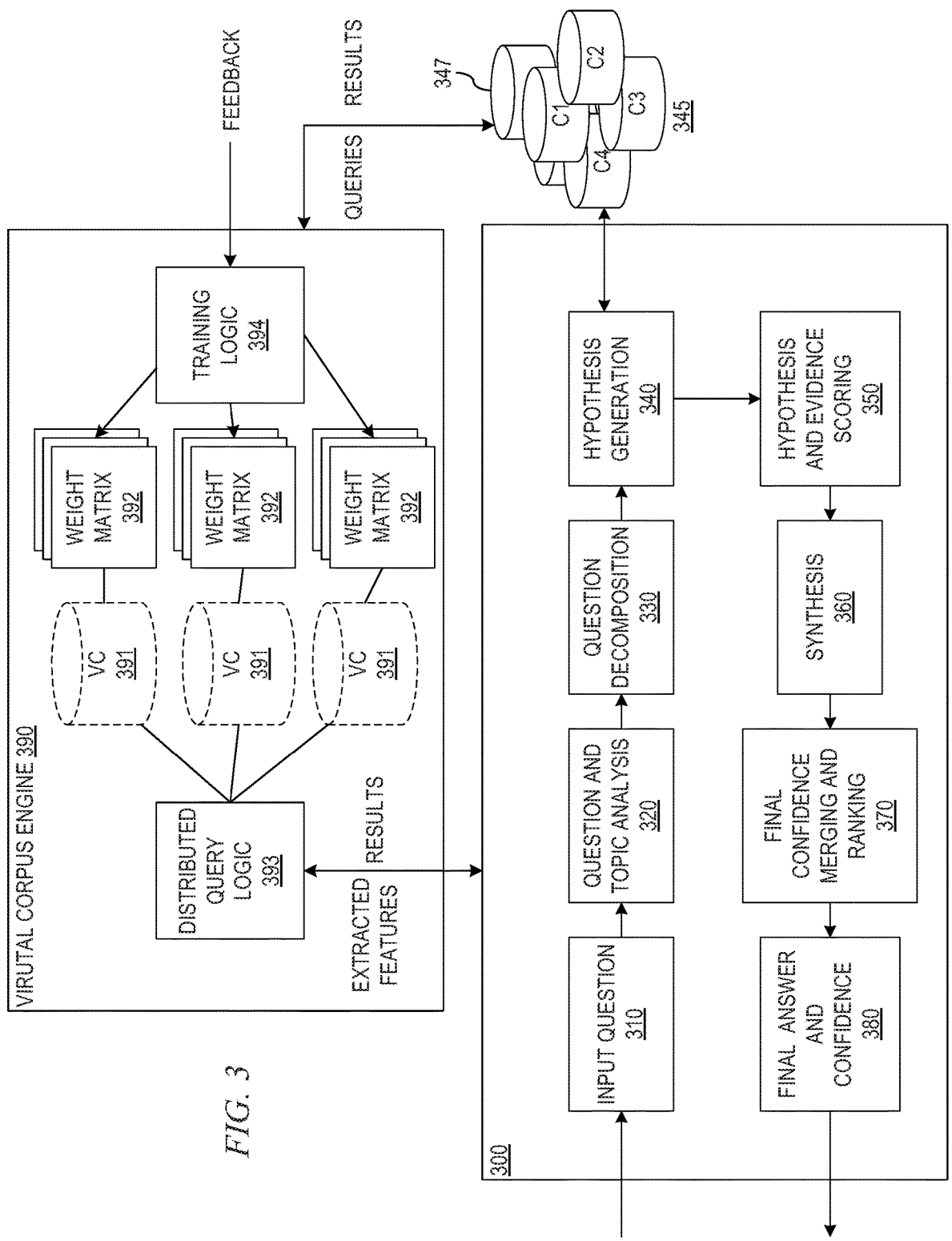
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to training and utilizing a virtual corpus to perform cognitive operations in a cognitive system, such as answering natural language questions using natural language corpora from distributed sources.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system.

For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a virtual corpus engine 120. The virtual corpus engine 120 provides logic for facilitating the operation of the cognitive system 100 with a distributed set of corpora 130-136 from a variety of different sources such that each of the corpora 130-136 have different documents, portions of content, or other sources of information provided as electronic data. For example, different electronic forms of web pages, documents, articles, trade publications, journals, records, and the like, may be provided in the various corpora 130-136. The corpora 130-136 may have some overlap of the content in the various corpora but have different coverage of subject matter.

The virtual corpus engine 120 comprises distributed query logic 122 that facilitates the forwarding and application of queries to the various corpora 130-136 of a virtual corpus 128. The virtual corpus engine 120 further comprises training logic 124 for training the virtual corpus 128 by modifying weights in a matrix 126 associated with a topic to thereby customize the virtual corpus 128 for the particular topic based on an evaluation of the results generated by utilizing the various corpora 130-136 to generate results for inquiries. These matrices 126, each topic having a corresponding matrix 126, may be used to customize the corpora 130-136 of the virtual corpus 128 used to generate results for a particular topic. Thus, the same virtual corpus 128 may be used for generating results for a plurality of different inquiries of different topics and may be customized to the particular topics by utilizing different weights to indicate which corpora 130-136 are trusted, untrusted, or indeterminate for a particular topic. The details of the operation of the virtual corpus engine 120 will be described in greater detail hereafter with regard to FIG. 4.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 may operate in conjunction with a virtual corpus engine 390 that comprises logic for establishing and utilizing one or more virtual corpora 391 and their associated corpora weight matrices 392. A virtual corpus 391 is a combination of one or more actual corpora 347. For example, a first virtual corpus 391 may comprise corpora A-C and a second virtual corpus 391 may comprise corpora D-G. The virtual corpus 391, from the view point of the cognitive system, such as the QA system pipeline 300, is a single corpus to which queries are applied. However, within the virtual corpus 391, the queries are distributed to the one or more actual corpora 347 with which the virtual corpus 391 is associated.

The virtual corpus engine 390 comprises distributed query logic 393 that facilitates the forwarding and application of queries, such as those generated by the question decomposition stage 330, to the various corpora 347 of a virtual corpus 391. In one illustrative embodiment, the various virtual corpora 391 maintained by the virtual corpus engine 390, may be associated with different domains, topics, categories, or other features extractable from the input question 310. That is, in analyzing and extracting features from the input question 310, a domain and a topic of the input question, for example, may be extracted. The domain may be used by the distributed query logic 393 to identify a virtual corpus 391, associated with the domain, from a plurality of virtual corpora 391, to which the queries associated with the input question are to be submitted. The distributed query logic 393 may identify the virtual corpus 391 and submit the queries to each of the actual corpora 347 that are associated with the virtual corpus 391.

The submission of the queries to the actual corpora 347 involves the application of the queries against the corpora 347 by the distributed query logic 393 such that candidate answers and/or evidence are returned, as discussed above. The source corpus 345 of each of the candidate answers is tracked by training logic 394 of the virtual corpus engine 390 for training the virtual corpus 391. The training of the virtual corpus 391 is performed by modifying weights in a corresponding virtual corpus weight matrix 392 associated with the virtual corpus 391 and a topic of the input question 310 to thereby customize the virtual corpus 391 for the particular topic. The modification of the weights in the weight matrix 392 is performed based on an evaluation of feedback regarding candidate answers generated based on the various actual corpora 347. The feedback may be in the form of user feedback, comparison to known correct answers to an input question, such as in the form of a ground truth data structure, or the like. Based on a determined degree of correctness indicated in the feedback for a particular candidate answer, the weight of the corresponding corpus from which the candidate answer was obtained is increased or decreased in the corresponding matrix 392 of the virtual corpus 391 for the particular topic. Thus, there is a separate matrix 392 for each topic, and there is a set of matrices 392 for each virtual corpus 391.

These matrices 392, each topic having a corresponding matrix 392, may be used to customize the corpora 347 of the virtual corpus 391 used to generate results for a particular topic. Thus, the same virtual corpus 391 may be used for generating results for a plurality of different inquiries of different topics and may be customized to the particular topics by utilizing different weights to indicate which corpora 347 are trusted, untrusted, or indeterminate for a particular topic.

Thus, assuming that a virtual corpus 391 has been created that includes a plurality of actual corpora 347 provided by a plurality of different sources of corpora. An inquiry is submitted to the cognitive system, which may include QA system pipeline 300, which utilizes the virtual corpus 391 to perform a cognitive operation to respond to the inquiry, e.g., generate an answer to the input question 310. The inquiry, e.g., input question 310, is classified by topic, concept, domain, or the like, by the virtual corpus engine's distributed query logic 393. Based on the classification of the input question, a corresponding virtual corpus 391 and weight matrix are selected by the distributed query logic 393. In one illustrative embodiment, the domain of the input question 310 is used to select a virtual corpus 391, and the topic T is used to indicate the particular weight matrix 392 to be applied to identify which actual corpus are trusted, untrusted, or indeterminate, in the corpora 347 of the virtual corpus 391. If the topic T is new and has not been encountered previously by the cognitive system, a new weight matrix 392 is initialized for the topic T giving equal weight to each associated actual corpus 347, e.g., actual corpora C1-C3, within the virtual corpus 391, referred to as VC. The weights indicate the level of reliability of the information provided by the corresponding corpus C1-C3 when providing results to an inquiry, e.g., input question 310, associated with topic T.

The QA system pipeline 300 of the cognitive system may generate one or more queries, such as the queries generated by the stage 330, which are submitted to the virtual corpus 391 VC which in turn submits each of the queries to each of the actual corpora 347 C1-C4 and aggregates responses obtained from the various corpora C1-C4. Thus, the queries are applied to each of the corpora C1-C4 which individually generate a set of results. Each set of results is returned to the virtual corpus engine 390 which in turn returns the results to the QA system pipeline 300 of the cognitive system. The source of the sets of results is maintained so that it can be determined which corpus C1-C4 each result came from. The results may be compared against a ground truth, may be presented to users to solicit feedback, or otherwise evaluated to determine the accuracy of the results obtained from each of the corpora C1-C4.

In one illustrative embodiment, the results from each of the corpora C1-C4 are presented to a user that submitted the original inquiry, e.g., input question 310, for evaluation and user feedback. For example, the results may be presented to the user and the user may evaluate each result with a range of possible user feedback values, e.g., 0 to 5 "stars" or any other suitable user feedback value range. Based on the user feedback, the weights associated with the various corpora C1-C4 are adjusted for the particular topic T in the corresponding weight matrix 392. Thus, each topic T has its own weight matrix that is trained over time to indicate which corpora C1-C4 of the virtual corpus VC are the most effective in providing accurate results for queries involving the topic T.

As the training of the virtual corpus for various topics T progresses, the weights in the matrices 392 of the various topics T are adjusted based on the evaluation of the results, e.g., user feedback. Ideally, for a particular topic T, one or more corpora C1-C4 will become "trusted" sources of information while other corpora may become "untrusted" sources of information. A trusted source is a source whose associated corpora weight has met or exceeded a threshold value. An untrusted source is a source whose associated corpora weight has fallen below the threshold value, or another threshold value, e.g., a first threshold may be used to indicate trusted sources, and a second threshold may be used to indicate untrusted sources. For example, if a weight value is equal to or above 0.75 then it may be indicated to be a trusted source. If a weight value is below 0.30 then it may be indicated to be an untrusted source. A weight value between 0.30 and 0.74 may be determined to be indeterminate. Of course these values may be any suitable value for the particular implementation and these values are only examples.

With the training of the virtual corpus engine 390 with regard to the various virtual corpora 391 by submission of inquiries (e.g., input questions) and evaluation of the returned results, e.g., candidate answers, such as by way of user feedback, evaluation with regard to a ground truth, or the like, subsequent inquiries are submitted to the cognitive system which then processes the inquiries, e.g., input questions processed by the QA system pipeline 300, using the trained virtual corpora 391. The virtual corpora 391 have preferably eliminated the untrusted sources, and therefore their corpora C1-C4, from the virtual corpora 391, such as by setting their weight values to 0.0 for example or otherwise disassociating the untrusted corpora from the virtual corpus VC for the particular topic T. Thus, the untrusted sources will not be used as a basis for generating results for the subsequent inquiries. For example, when the queries are being forwarded for application to the various actual corpora 347 of the virtual corpus 391, the distributed query logic 393 may look at the weights in the corresponding weight matrix 392 to identify which corpora 347 have a weight value below a threshold. For those corpora having a weight value below the threshold, the queries are not sent to those corpora, thereby effectively removing those corpora 347 from the virtual corpus 391 for the particular topic T.

Moreover, the results generated from the trusted sources and the sources that are indeterminate sources, i.e. sources that are neither determined to be trusted or untrusted, may be weighted accordingly, based on their weights in the matrix for the topic T of the inquiry. Thus, more trusted sources will have higher weights than less trusted sources and sources that are untrusted are eliminated from the virtual corpus 391 entirely, or given zero weight value. These weights may be used to modify the scoring of the candidate answers generated by the various actual corpora 347 of the virtual corpus 391 when processing input questions and generating answers to these input questions. Thus, candidate answers generated from corpora 347 that are more trusted are given a greater score or confidence value than corpora 347 that are determined to be less trusted. As a result, a more accurate operation of the distributed cognitive system is made possible by the implementation of the illustrative embodiments.

It should be appreciated that while FIG. 3 has been described in terms of the QA system pipeline 300 receiving the input question 310, generating queries that are sent to the virtual corpus engine 390 for distribution to the actual corpora 347 of a virtual corpus 391 corresponding to the extracted domain of the input question 310, with corresponding weight matrix 392 for the extracted topic feature being utilized to indicate which corpora 347 are to be used to provide results to the queries and possibly weighting the results accordingly, the invention is not limited to such. Rather, in other illustrative embodiments, multiple QA system pipelines 300, acting as "agents", may be deployed in association with different corpora 347 and inquiries or input questions 310 may initially be submitted to the virtual corpus engine 390 which then distributes the inquiry or input question to the various agents, e.g., QA system pipelines 300. The virtual corpus engine 390 may perform an initial analysis of the inquiry/input question to extract domain and topic features which are then used to select a virtual corpus 391 and corresponding weight matrix for the topic. The distributed query logic 393 may then determine which agents to which to distribute the inquiries/input questions based on the retrieved weight matrix for the topic, e.g., corpora of the selected virtual corpus that are determined to be "untrusted" based on their weight values may not have the inquiry/input question distributed to their corresponding agent. The agents that receive the inquiry/input question may process the inquiry or input question in the normal manner as discussed above and return results. The results may then be weighted according to the corresponding weight values in the weight matrix for the topic.

Figure 4A:
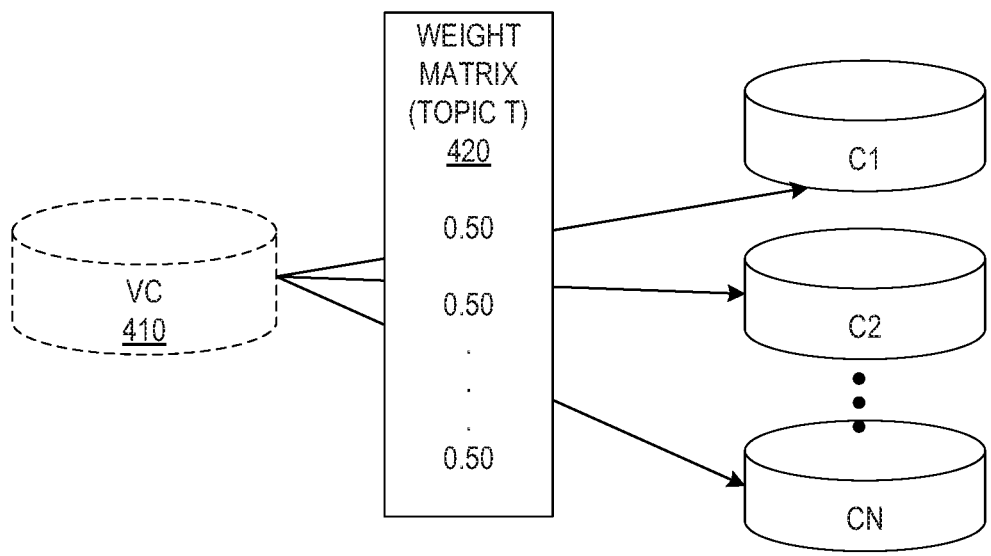
FIG. 4A illustrates an initial setting of the weight matrix for a virtual corpus as part of an initialization of the weight matrix for a particular topic encountered when using the virtual corpus in accordance with one illustrative embodiment.
Figure 4B:
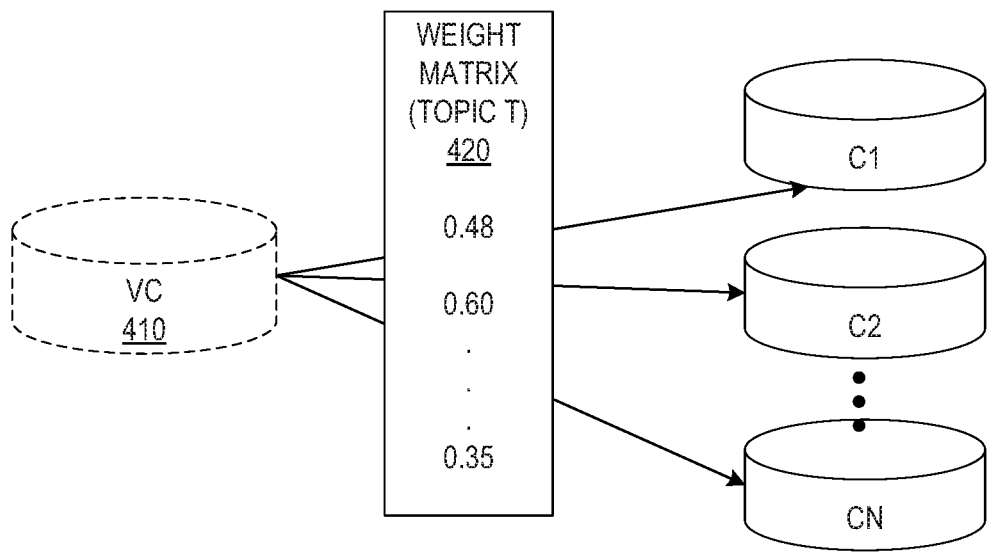
FIG. 4B illustrates the same virtual corpus and weight matrix mechanism as shown in FIG. 4A after a period of training of the virtual corpus engine in accordance with one illustrative embodiment.

FIGS. 4A and 4B illustrate the training of a weight matrix for a virtual corpus in accordance with one illustrative embodiment. FIG. 4A illustrates an initial setting of the weight matrix for a virtual corpus as part of an initialization of the weight matrix for a particular topic encountered when using the virtual corpus. That is, when the cognitive system, e.g., the QA system, encounters a query from which a topic feature is extracted and that topic has not been encountered previously, a new weight matrix 420 is generated and associated with the virtual corpus 410 for the particular topic T. The weight matrix 420 comprises a separate weight value for each of the actual corpora C1-Cn that together constitute the virtual corpus 410. Since it is not known at initialization stage which corpora C1-Cn are trusted or untrusted sources for the particular topic T, the weight values for each of the corpora C1-Cn in the weight matrix 420 are set to an initial value. The initial value in the depicted example is 0.5 (on a range from 0.0 (fully untrusted) to 1.0 (fully trusted)), but any desired initial value may be used without departing from the spirit and scope of the illustrative embodiments.

Of course, if it is known ahead of time that one or more of the corpora C1-Cn are more or less trusted than others, the corresponding weight values may be initially set to non-default values or may be overridden by an authorized user or process to replace the initial weight value with a different weight value that is indicative of the level of trustworthiness of the corpora C1-Cn with regard to the particular topic T. For example, it may be the case that a financial investment firm values the internal reports of a company (corpus C1) and external analyst reports of the ratings of the company (corpus C2) more highly than publicly available data about historical performance of the company (corpus C3). In such a case, the initial weight values of the various corpora C1-C3 may be set according to the predetermined level of confidence or importance in the corpora such that corpora C1 and C2 have a higher weight value than the weight value of corpus C3.

As noted above, as part of the training of the virtual corpus mechanisms of the illustrative embodiments, inquiries are processed by sending the inquiries, or the corresponding queries generated from the inquiries, to be applied to the various corpora C1-Cn and corresponding responses are returned, e.g., candidate answers. The results are evaluated, such as by eliciting user feedback responses regarding the correctness of the results, comparing the results to a ground truth data structure, or otherwise providing mechanisms for evaluating the correctness of the results returned. Based on the determined degree of correctness, the weight values associated with the corpus from which the results were obtained are modified. If the corpus provided a result that was determined to be correct, the weight value is increased, whereas if the corpus returned a result that was determined to be incorrect, then the weight value is decreased, for example. In some illustrative embodiments, feedback regarding correctness/incorrectness of results may be accumulated over a predetermined period of time and aggregated to determine an amount of adjustment to be applied to the weight values of the various corpora C1-Cn.

FIG. 4B illustrates the same virtual corpus and weight matrix mechanism as shown in FIG. 4A after a period of training of the virtual corpus engine. As shown in FIG. 4B, the weight values of the various corpora have been modified from their initial values according to the feedback or evaluation of the correctness/incorrectness of the results obtained from the various corpora. Thus, the weight values for corpora C1 and Cn have been decreased while the weight value for corpus C2 has increased. It should be appreciated, as noted above, that these weight values may be compared to one or more thresholds to determine whether the corresponding corpora C1-Cn should be included in the virtual corpus for a particular topic, e.g., should be the basis upon which an application of an inquiry or queries submitted to the virtual corpus should be made to return results.

The adjustment to the weight values for the various corpora based on the feedback or evaluation of the correctness/incorrectness of the results may be performed in many different ways. In one illustrative embodiment, users may provide feedback using a scale indicative of the level of correctness of the results. For example, a −1/0/1 rating scale may be used by the users to rate the results obtained from the various corpora. Thus, if a user finds a result to be correct, a value of 1 may be assigned. If the user finds the result to be incorrect, then a rating of −1 may be assigned. Otherwise, the value of 0 is assigned indicating that no change is applied to the weight value for that particular corpus. The values −1/0/1 may have a weighting factor, e.g., 0.001, applied to them and the corresponding value may then be added to the existing weight value, thereby increasing or decreasing the weight value by the weighted feedback value.

In another illustrative embodiment, the weight values may be adjusted using a rating range, e.g., 1 to 5, and a logarithmic scaling factor. Similar to the embodiment mentioned above, the results are obtained and rated by user feedback on a scale from 1 to 5, e.g., 5 corresponding to results that are correct and 1 corresponding to results that are incorrect. The log 10 of the user feedback rating may be calculated and then added to the existing weighting value for the corpus.

In yet another illustrative embodiment, a normalization of the confidence scores associated with the returned results may be utilized to adjust the weight values. For example, results with corresponding confidence scores may be obtained from the various corpora, e.g., 0.10, 0.85, and 0.55. These confidence scores may be normalized, e.g., (0.10-0.10)/(0.85-0.10), (0.85-0.10)/(0.85-0.10), (0.55-0.10)/(0.85-0.10). The resulting values may be multiplied by a weighting factor, e.g., 0.01, and added to the existing weight value to generate the new weight value.

In still other illustrative embodiments, the above embodiments may be combined with a time based solution in which the adjustments to the weight values decay over time unless a new adjustment is received. For example, if corpus C1 receives new feedback and receives a positive addition, e.g., 0.05, if no new feedback is received, the positive addition would decay based on time. For example, after X time, the positive addition may be decayed to 0.25 and then at time X+1, the time is decayed to 0.125, etc., until the weight value is returned to the initial value. Of course other implementations and embodiments for adjusting the weight values of the various corpora of a virtual corpus may be used with the mechanisms of the illustrative embodiments without departing from the spirit and scope of the present invention.

It should be appreciated that the training of the weight value matrices for the virtual corpus may be performed during a training stage for training the cognitive system and specifically the virtual corpus engine with which the cognitive system operates. In addition, or alternatively, the training may be performed dynamically as the cognitive system is operating in runtime execution and processing actual inquiries from users and/or other processes. Thus, the training of the virtual corpus engine may be on-going, periodically performed, or otherwise performed as needed to ensure proper operation of the cognitive system utilizing the virtual corpus engine. In some cases, the training may be initialized in response to the occurrence of an event, such as an update to a corpus, the incorporation of a new corpus into a virtual corpus, the creation of a new virtual corpus, an administrative user's request to initiate training, or the like.

Figure 5:
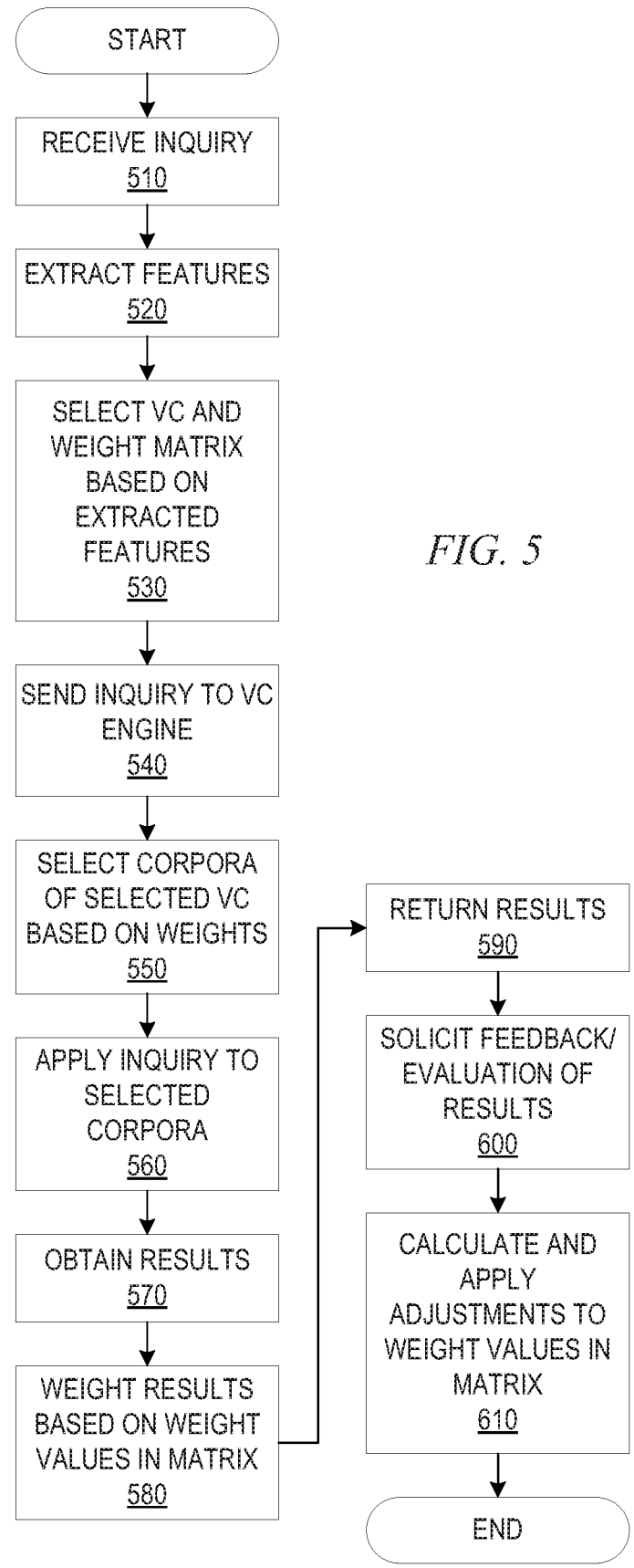
FIG. 5 is a flowchart outlining an example operation for utilizing and training a virtual corpus engine in accordance with one illustrative embodiment.

FIG. 5 is a flowchart outlining an example operation for utilizing and training a virtual corpus engine in accordance with one illustrative embodiment. As shown in FIG. 5, the operation starts with receiving an inquiry for processing by the cognitive system utilizing a virtual corpus which has been created and established for use by the cognitive system (step 510). For example, the inquiry may be a natural language question posed to the cognitive system. The inquiry is processed to extract domain and topic features (step 520) which are then provided to a virtual corpus engine that selects a virtual corpus corresponding to the extracted features, e.g., the domain, and a weight matrix corresponding to the extracted features, e.g., the topic (step 530). It should be appreciated that if the topic has not been previously encountered by the virtual corpus engine for the selected virtual corpus, then a new weight matrix may be initialized for the topic.

The virtual corpus engine receives the inquiry, or queries generated based on processing of the inquiry (step 540) and selects corpora associated with the virtual corpus to which the inquiry/queries are to be applied based on the weights in the weight matrix for the topic (step 550). For example, comparing the weight values in the weight matrix, the virtual corpus engine may eliminate from consideration any corpora that have a weight value below a predetermined threshold. The inquiry/queries are applied to the selected corpora (step 560) and results are obtained from the selected corpora (step 570). The results may be weighted based on the corresponding weight values in the weight matrix to thereby rank the results (step 580). The results are then returned to the originator of the inquiry (step 590).

User feedback regarding the correctness of the results returned is solicited with the output of the results to the originator of the inquiry (step 600). Based on the user feedback obtained, adjustments to the weight values of the various corpora in the weight matrix for the topic are calculated and applied to the existing weight values to thereby update the weight matrix for the topic (step 610). The operation then terminates.

Thus, the illustrative embodiments provide mechanisms for training and utilizing a virtual corpus to perform cognitive operations in a cognitive system, such as a Question and Answer system, advanced search engine, recommendation engine, or other cognitive system. The illustrative embodiments utilize weight matrices associated with a virtual corpus, that are customized for various topics such that the same virtual corpus may have different compositions for different topics or different relative measures of confidence in corpora for different topics. In this way, only the corpora of the virtual corpus determined to be the most reliable in providing correct results to an inquiry are utilized when responding to inquiries directed to particular topics.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method, in a data processing system comprising a processor and a memory having instructions which, when executed by the processor, causes the processor to implement a virtual corpus engine, the method comprising:

receiving, by the virtual corpus engine of the data processing system, an inquiry to be processed, wherein the inquiry is based on an input from a device;

analyzing, by the virtual corpus engine, the inquiry to extract one or more features of the inquiry and select a virtual corpus from a plurality of virtual corpora based on a first feature in the one or more features;

selecting, by the virtual corpus engine, a weight matrix, from a plurality of weight matrices associated with the selected virtual corpus, based on at least one second feature of the extracted one or more features of the inquiry, wherein the virtual corpus is a logical data structure that comprises a plurality of actual corpora of information stored as a plurality of content data structures in one or more data storage devices, and wherein the weight matrix comprises a separate weight value for each actual corpus in the plurality of actual corpora;

processing, by the virtual corpus engine, the inquiry using a set of selected actual corpora selected from the plurality of actual corpora based on the weight values in the weight matrix;

outputting, by the virtual corpus engine, results of the processing of the inquiry to the device; and executing a training operation of the virtual corpus engine to train the selected virtual corpus by modifying the separate weight values for the actual corpora, in the selected weight matrix, based on an evaluation of correctness of the results of processing the inquiry, wherein the evaluation of correctness is based on at least one of user feedback rating the correctness of the results or a comparison of the results to a ground truth specifying correct results, and wherein modifying the separate weight values comprises modifying the weight values by quantities determined based on the evaluation of correctness.

2. The method of claim 1, wherein the one or more features of the inquiry comprise a topic or domain of the inquiry, and wherein selecting the weight matrix associated with the virtual corpus based on the extracted one or more features of the inquiry comprises selecting the weight matrix associated with the virtual corpus based on the topic or domain of the inquiry.

3. The method of claim 1, wherein the one or more features of the inquiry comprise a topic or domain of the inquiry, and wherein selecting a weight matrix associated with the virtual corpus based on the extracted one or more features of the inquiry comprises:

determining if there is a weight matrix already defined for the topic or domain; and in response to determining that a weight matrix has not already been defined for the topic or domain, creating a new weight matrix associated with the topic or domain and initializing the weight matrix to an initial set of weight values for each of the actual corpora in the plurality of actual corpora.

4. The method of claim 1, wherein processing the inquiry using a set of selected actual corpora selected from the plurality of actual corpora based on the weight values in the weight matrix comprises submitting the inquiry to each of the actual corpora in the set of selected actual corpora and receiving results from each of the corpora in the set of selected actual corpora.

5. The method of claim 1, wherein outputting the results of the processing comprises:

outputting, separately for each selected actual corpus in the set of selected actual corpora, results generated by that selected actual corpus; and receiving, for each result from each selected actual corpus of the set of selected actual corpora, user feedback rating a correctness of the result, and wherein modifying the separate weight values comprises modifying, for each selected actual corpus, in the set of selected actual corpora, a corresponding weight value in the selected weight matrix, associated with the selected actual corpus based on the user feedback associated with the result received from that selected actual corpus.

6. The method of claim 1, wherein outputting the results of the processing comprises outputting, separately for each selected actual corpus in the set of selected actual corpora, results generated by that selected actual corpus, wherein modifying the separate weight values comprises:

comparing each result in the results from each of the selected actual corpora, in the set of selected corpora, to a ground truth data structure to identify whether the result matches a correct answer to the inquiry; and modifying, for each selected actual corpus, in the set of selected actual corpora, a corresponding weight value in the selected weight matrix, associated with the selected actual corpus based on results of the comparison.

7. The method of claim 1, wherein there are a plurality of virtual corpora, each virtual corpus in the plurality of virtual corpora being associated with a different domain, and wherein for at least one virtual corpus in the plurality of virtual corpora, there are a plurality of weight matrices associated with the at least one virtual corpus, each weight matrix being associated with a different topic within the domain of the at least one virtual corpus, and wherein the first feature is a domain feature of the inquiry and the second feature is a topic feature of the inquiry.

8. The method of claim 1, wherein processing, by the virtual corpus engine, the inquiry using a set of selected actual corpora selected from the plurality of actual corpora based on the weight values in the weight matrix comprises:

evaluating weight values associated with each actual corpus in the plurality of actual corpora against one or more threshold weight values; and selecting actual corpora from the plurality of actual corpora based on whether or not a weight value associated with the actual corpus meets or exceeds a threshold weight value in the one or more threshold weight values.

9. The method of claim 8, wherein the one or more threshold weight values comprises a first threshold weight value indicating a trusted corpus and a second threshold weight value indicating an untrusted corpus.

10. The method of claim 9, wherein selecting actual corpora from the plurality of actual corpora comprises selecting actual corpora whose associated weight values in the weight matrix are equal to or above the second threshold.

11. A computer program product comprising a computer readable storage medium having a computer readable program stored therein, wherein the computer readable program, when executed on a computing device, causes the computing device to implement a virtual corpus engine that operates to:

receive an inquiry to be processed, wherein the inquiry is based on an input from a device;

analyze the inquiry to extract one or more features of the inquiry and select a virtual corpus from a plurality of virtual corpora based on a first feature in the one or more features;

select a weight matrix, from a plurality of weight matrices associated with the selected virtual corpus, based on at least one second feature of the extracted one or more features of the inquiry, wherein the virtual corpus is a logical data structure that comprises a plurality of actual corpora of information stored as a plurality of content data structures in one or more data storage devices, and wherein the weight matrix comprises a separate weight value for each actual corpus in the plurality of actual corpora;

process the inquiry using a set of selected actual corpora selected from the plurality of actual corpora based on the weight values in the weight matrix;

output results of the processing of the inquiry to the device; and execute a training operation to train the selected virtual corpus by modifying the separate weight values for the actual corpora, in the selected weight matrix, based on an evaluation of correctness of the results of processing the inquiry, wherein the evaluation of correctness is based on at least one of user feedback rating the correctness of the results or a comparison of the results to a ground truth specifying correct results, and wherein modifying the separate weight values comprises modifying the weight values by quantities determined based on the evaluation of correctness.

12. The computer program product of claim 11, wherein the one or more features of the inquiry comprise a topic or domain of the inquiry, and wherein selecting the weight matrix associated with the virtual corpus based on the extracted one or more features of the inquiry comprises selecting the weight matrix associated with the virtual corpus based on the topic or domain of the inquiry.

13. The computer program product of claim 11, wherein the one or more features of the inquiry comprise a topic or domain of the inquiry, and wherein selecting a weight matrix associated with the virtual corpus based on the extracted one or more features of the inquiry comprises:

determining if there is a weight matrix already defined for the topic or domain; and in response to determining that a weight matrix has not already been defined for the topic or domain, creating a new weight matrix associated with the topic or domain and initializing the weight matrix to an initial set of weight values for each of the actual corpora in the plurality of actual corpora.

14. The computer program product of claim 11, wherein processing the inquiry using a set of selected actual corpora selected from the plurality of actual corpora based on the weight values in the weight matrix comprises submitting the inquiry to each of the actual corpora in the set of selected actual corpora and receiving results from each of the corpora in the set of selected actual corpora.

15. The computer program product of claim 11, wherein outputting the results of the processing comprises:
   outputting, separately for each selected actual corpus in the set of selected actual corpora, results generated by that selected actual corpus; and
   receiving, for each result from each selected actual corpus of the set of selected actual corpora, user feedback rating a correctness of the result, and wherein modifying the separate weight values comprises modifying, for each selected actual corpus, in the set of selected actual corpora, a corresponding weight value in the selected weight matrix, associated with the selected actual corpus based on the user feedback associated with the result received from that selected actual corpus.

16. The computer program product of claim 11, wherein outputting the results of the processing comprises outputting, separately for each selected actual corpus in the set of selected actual corpora, results generated by that selected actual corpus, wherein modifying the separate weight values comprises:
   comparing each result in the results from each of the selected actual corpora, in the set of selected corpora, to a ground truth data structure to identify whether the result matches a correct answer to the inquiry; and
   modifying, for each selected actual corpus, in the set of selected actual corpora, a corresponding weight value in the selected weight matrix, associated with the selected actual corpus based on results of the comparison.

17. The computer program product of claim 11, wherein there are a plurality of virtual corpora, each virtual corpus in the plurality of virtual corpora being associated with a different domain, and wherein for at least one virtual corpus in the plurality of virtual corpora, there are a plurality of weight matrices associated with the at least one virtual corpus, each weight matrix being associated with a different topic within the domain of the at least one virtual corpus, and wherein the first feature is a domain feature of the inquiry and the second feature is a topic feature of the inquiry.

18. The computer program product of claim 11, wherein processing the inquiry using a set of selected actual corpora selected from the plurality of actual corpora based on the weight values in the weight matrix comprises:
   evaluating weight values associated with each actual corpus in the plurality of actual corpora against one or more threshold weight values; and
   selecting actual corpora from the plurality of actual corpora based on whether or not a weight value associated with the actual corpus meets or exceeds a threshold weight value in the one or more threshold weight values.

19. The computer program product of claim 18, wherein the one or more threshold weight values comprises a first threshold weight value indicating a trusted corpus and a second threshold weight value indicating an untrusted corpus.

20. An apparatus comprising:
   a processor; and
   a memory coupled to the processor, wherein the memory comprises instructions which, when executed by the processor, cause the processor to:
   receive an inquiry to be processed, wherein the inquiry is based on an input from a device;
   analyze the inquiry to extract one or more features of the inquiry and select a virtual corpus from a plurality of virtual corpora based on a first feature in the one or more features;
   select a weight matrix, from a plurality of weight matrices associated with the selected virtual corpus, based on at least one second feature of the extracted one or more features of the inquiry, wherein the virtual corpus is a logical data structure that comprises a plurality of actual corpora of information stored as a plurality of content data structures in one or more data storage devices, and wherein the weight matrix comprises a separate weight value for each actual corpus in the plurality of actual corpora;
   process the inquiry using a set of selected actual corpora selected from the plurality of actual corpora based on the weight values in the weight matrix;
   output results of the processing of the inquiry to the device; and execute a training operation to train the selected virtual corpus by modifying the separate weight values for the actual corpora, in the selected weight matrix, based on an evaluation of correctness of the results of processing the inquiry, wherein the evaluation of correctness is based on at least one of user feedback rating the correctness of the results or a comparison of the results to a ground truth specifying correct results, and wherein modifying the separate weight values comprises modifying the weight values by quantities determined based on the evaluation of correctness.

\* \* \* \* \*